US008352439B1

United States Patent
Lee et al.

(10) Patent No.: US 8,352,439 B1
(45) Date of Patent: Jan. 8, 2013

(54) DATABASE VERIFICATION FOLLOWING DATABASE WRITE

(75) Inventors: Terry Seto Lee, Arcadia, CA (US); Arieh Don, Newton, MA (US); Xiali He, South Grafton, MA (US); Philip E. Tamer, Westboro, MA (US); Alexandr Veprinsky, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 2362 days.

(21) Appl. No.: 10/861,830

(22) Filed: Jun. 3, 2004

(51) Int. Cl.
  *G06F 7/00* (2006.01)
  *G06F 17/00* (2006.01)
(52) U.S. Cl. ............... 707/687; 714/52; 714/53; 714/54
(58) Field of Classification Search .................. 707/1, 2, 707/9, 206, 687; 714/2, 6, 52, 53, 54
See application file for complete search history.

(56) References Cited

U.S. PATENT DOCUMENTS

| 5,426,747 | A  | * | 6/1995 | Weinreb et al. | 711/203 |
| 6,400,785 | B1 | * | 6/2002 | Sunaga et al. | 375/372 |
| 6,564,219 | B1 | * | 5/2003 | Lee et al. | 707/100 |
| 6,697,971 | B1 | * | 2/2004 | Dwyer | 714/54 |

\* cited by examiner

*Primary Examiner* — Apu Mofiz
*Assistant Examiner* — Jared Bibbee
(74) *Attorney, Agent, or Firm* — Occhiuti Rohlicek & Tsao LLP (57) ABSTRACT

A method for processing a write instruction for writing data to a database stored on a logical device includes obtaining first and second addresses that specify the location of the data in respective first and second address spaces. A third address corresponding to an expected location of the data record in the first address space is then calculated. On the basis of a comparison between the first address and the third address, a determination is made as to whether to execute the write instruction.

23 Claims, 7 Drawing Sheets

```
stride = columns * size;
loglba = lba - host_offset;
if size # 0, then robin = loglba DIV size
          else robin = 0
end if;
opage = loglba + (robin * (stride-size)) +
              (stripe_col * stripe_size);
dba = opage DIV oblocksize
```

*FIG. 6*

```
offset = (column_number * size) - host_offset;
STRIDE = columns * size;
A = dba * oracle_block_size;
If Stride = 0 then
    B = 0
    MOD = 0
Else
    B = A / STRIDE
    MOD = A % STRIDE
End if;
MOD = A % STRIDE
lba = MOD + B * size - offset
```

*FIG. 7*

DATABASE VERIFICATION FOLLOWING DATABASE WRITE

FIELD OF INVENTION

This invention relates to data-storage systems, and in particular, to methods for the avoidance of database corruption.

BACKGROUND

A database application operates on databases made up of data records. Each data record includes a data portion, which contains the data of interest, and a header portion, which contains verification data whose function is to indicate the integrity of the record. Such verification data can include specified patterns written at pre-determined locations within the header, or checksum data that depends on the contents of the data portion of the data record.

A database application executing on a host often sends a data-storage system a write request to store data records at a target location. As part of executing the write request, the data-storage system executes certain data verification steps. Data verification tests typically include inspecting the verification data in each newly-written record to confirm the integrity of the data record. For example, the database application may verify the checksum verification, or check to see if a particular byte or group of bytes has a particular value.

These known data verification procedures readily distinguish between data records created by the database application and data records created by another application. In this way, they reduce the likelihood that bad data records will corrupt a database.

Sometimes, however, a database application will write a perfectly good data record into the wrong location within a database. Because the data record itself is good, the existing data verification procedures will not detect an error. However, because the good data record has been written to the wrong location, the database has nevertheless become corrupted.

SUMMARY

In one aspect, the invention includes a method for processing a write instruction for writing data to a database stored on a logical device. The method includes obtaining first and second addresses that specify the location of the data in respective first and second address spaces. A third address corresponding to an expected location of the data record in the first address space is then calculated. On the basis of a comparison between the first address and the third address, a determination is made as to whether to execute the write instruction.

In one practice, the invention also includes confirming that the first address matches the third address; and on the basis of that comparison, permitting the write instruction to be executed.

Another practice includes identifying a mismatch between the first address and the third address; and generating an error condition on the basis of that identification.

In one practice, the first address is selected to identify a location of the data relative to other data in the database; and the second address is selected to identify a location of the data relative to other data on the logical device. However, in an alternative practice, the first address is selected to identify a location of the data relative to other data on the logical device, and the second address is selected to identify a location of the data relative to other data in the database.

Calculation of a third address can include, for example, reading extent data from an extent table associated with said logical device, and calculating the third address at least in part on the basis of the extent data.

The reading of extent data can include, in some practices of the invention, the reading of data indicative of a fourth address identifying a location of a database record on the logical device; and an offset associated with each database record. In other practices of the invention; the reading of extent data can include reading data indicative of a host offset on the logical device and/or reading data associated with of striping of the database across a plurality of logical devices.

In another aspect, the invention includes a method for processing a write instruction for writing data to a database by obtaining an actual internal address that specifies a location of the data record relative to other data records in the database, obtaining an external address to which the data record is to be written, and retrieving extent data from which a correspondence between an internal address and an external address is derivable. On the basis of the extent data, a relationship between the actual internal address and the target address is determined.

Some practices of the invention also include confirming that the target address is consistent with the actual internal address, and consummating the write instruction.

Determining a relationship can include, for example, determining an expected internal address on the basis of the extent data and the target location. This can include confirming that the expected internal address is consistent with the actual internal address, and consummating the write instruction.

Alternatively, determining a relationship can include determining an expected external address on the basis of the extent data and the target location. In such cases, this can further include confirming that the expected external address is consistent with the target location, and consummating the write instruction.

Other practices of the invention include those in which retrieving extent data includes retrieving data indicative of a host offset for the logical device, and those in which retrieving extent data includes retrieving data descriptive of striping of the database across at least two logical devices.

In another aspect, the invention includes a computer-readable medium having, encoded thereon, instructions that, when executed by one or more digital computers, cause the one or more computers to carry out any of the foregoing methods.

Yet another aspect of the invention includes a data-storage system configured to carry out any of the foregoing methods, as well as a data storage system having a computer-readable medium that has, encoded thereon, instructions for causing one or more computers to carry out any of the foregoing methods.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

These and other features of the invention will be apparent from the following detailed description and the accompanying drawings, in which:

DETAILED DESCRIPTION

Figure 1:
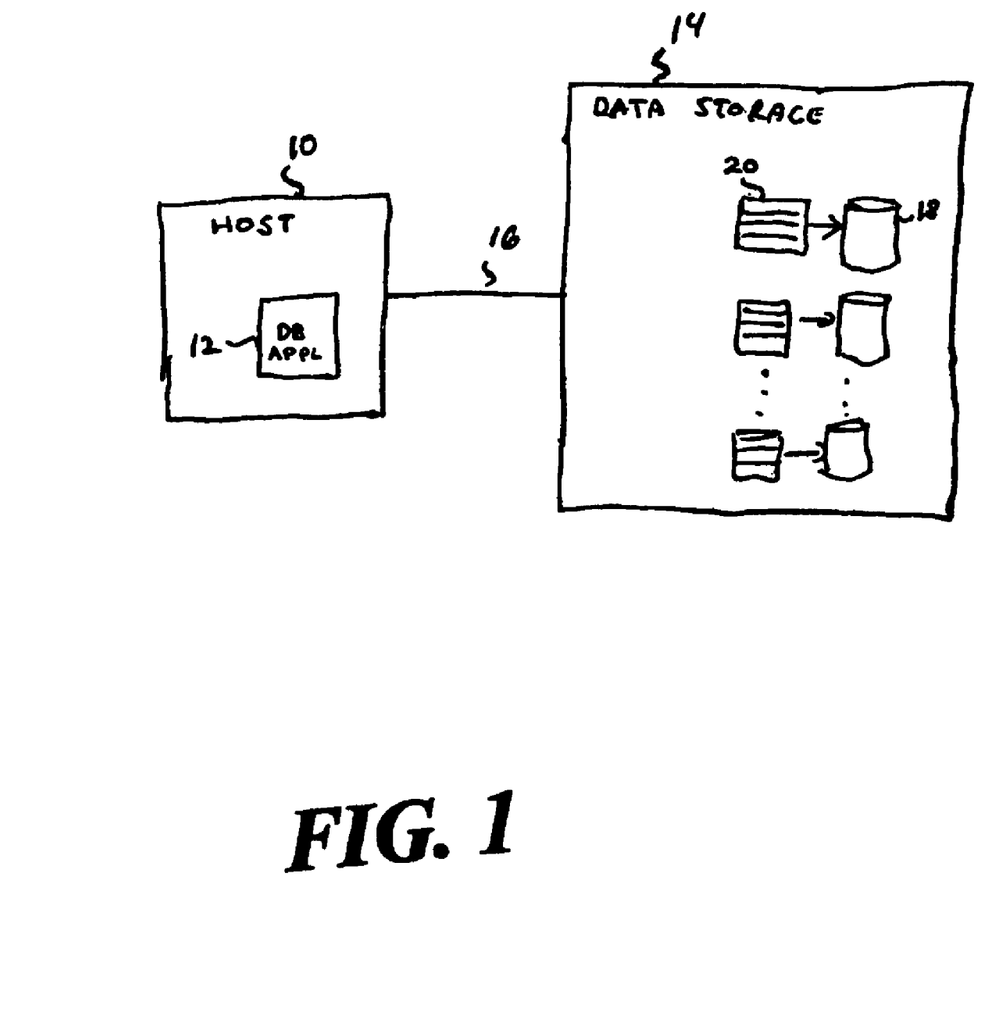
FIG. 1 shows a data storage system in data communication with a host.

Referring first to FIG. 1, a host 10 executing a database application 12 communicates with a data storage system 14 over a data communication line 16. An exemplary data storage system 14 for implementing the invention is a Symmetrix data storage system manufactured by EMC Corporation of Hopkinton, Mass.

The data storage system 14 includes physical devices (not shown) on which a database is stored. These physical devices, or portions thereof, are combined to form logical devices 18, each of which has an associated extent-table 20.

Figure 2:
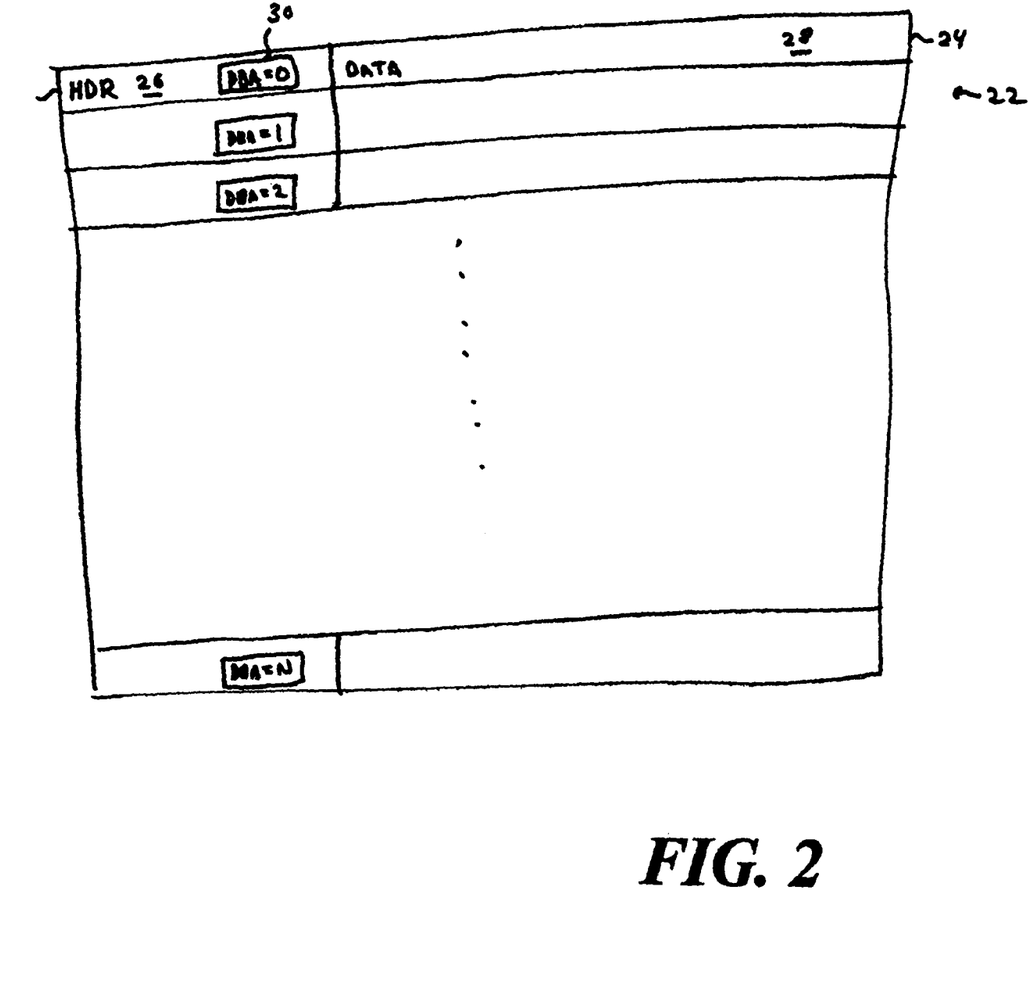
FIG. 2 is an abstract picture of a typical database.

As shown in FIG. 2, a database 22 is made up of database records 24, each of which has a header portion 26 and a data portion 28. The header portion 26 of a data record 24 contains an internal address 30, or "database block address" ("DBA"), that indicates the location of that data record 24 relative to other records within the database 22. For a typical database 22, the internal address 30 for the first record is zero, with subsequent records being incremented by one.

Figure 3:
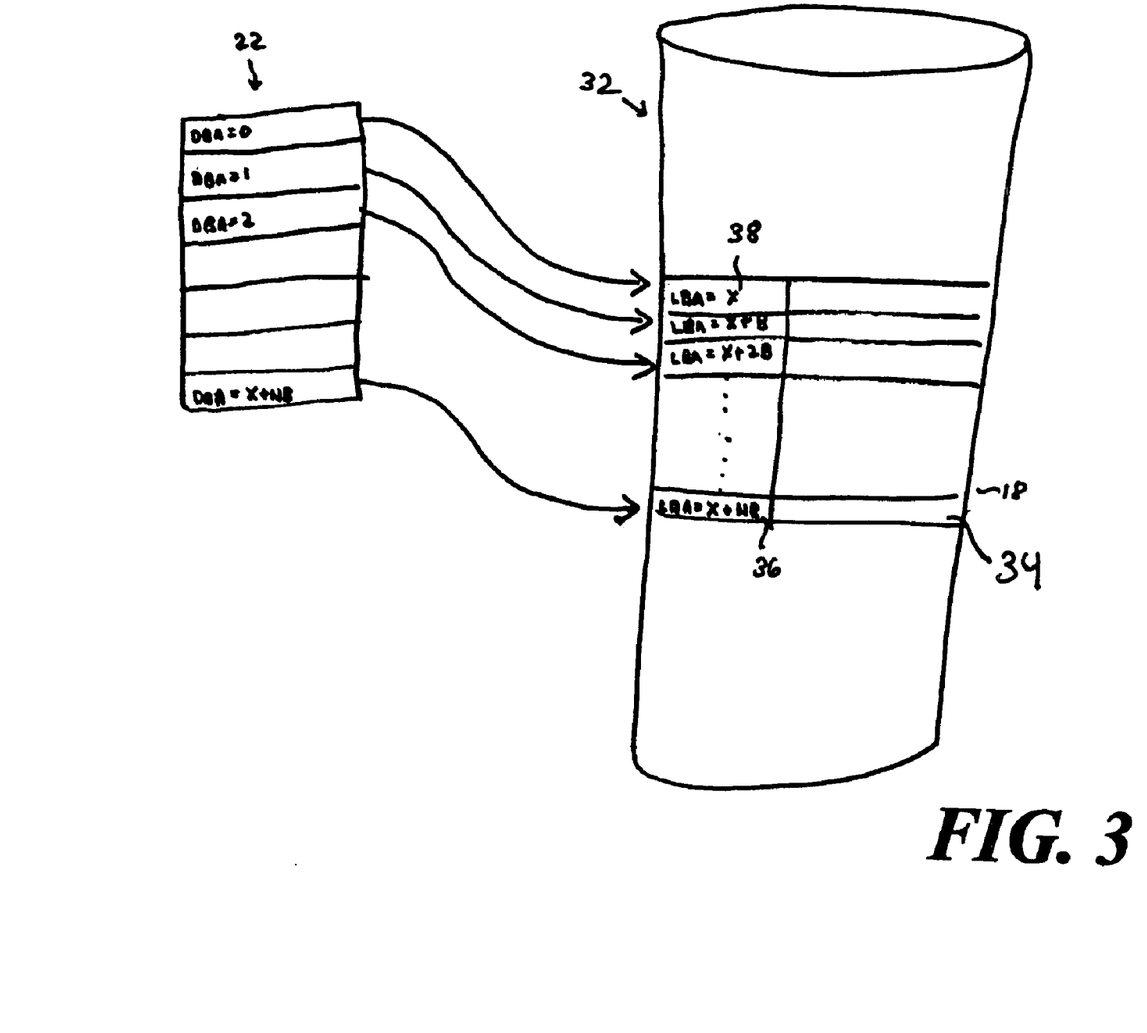
FIG. 3 shows an exemplary relationship between intra-database addresses and logical device-addresses.

FIG. 3 shows an exemplary logical device 18 on which a database application 12 stores a database 22. Storage locations 34 on the logical device 18 are identified by an external address 36, often referred to as the "logical block address," or "LBA." Unlike the internal address 30, which specifies a location relative to other database records 24 within a database 22, the external address specifies a location relative to other locations on a logical device 18.

A database 22 stored on a logical device 18 has a starting external address 38 that corresponds to the external address of the first record in that database. Subsequent records of the database 22 have external addresses 36 that are offset from the starting external address 38 by a fixed offset that corresponds to the size of each database record 24. This fixed offset shall be referred to herein as the "database record size."

Referring back to FIG. 1, the extent table 20 maintained by the data storage system 14 lists, for each of the logical devices 18 used by database 22: the external address 36 at which the first database record on that device is stored; information from which the internal address 30 that is stored in the header portion 26 of that first database record can be derived; and the database record size. Extent tables are described in greater detail in U.S. application Ser. No. 10/749,692, filed Dec. 29, 2003, the contents of which are herein incorporated by reference.

The extent-table 20 also provides additional information concerning the location of the database 22. For example, in certain logical devices 18, a range of addresses at the beginning of the logical address space is reserved for use as a device label. This results in an offset, referred to as a "host offset," that is stored in the extent-table 20 for that logical device 18.

In addition, a database 22 may be striped across two or more logical devices 18. The number of logical devices 18 across which the database 22 is striped (the number of columns), the extent of each stripe (the stripe size), and the column number corresponding to the external start address 38 are also stored in the relevant extent tables 20.

Figure 4:
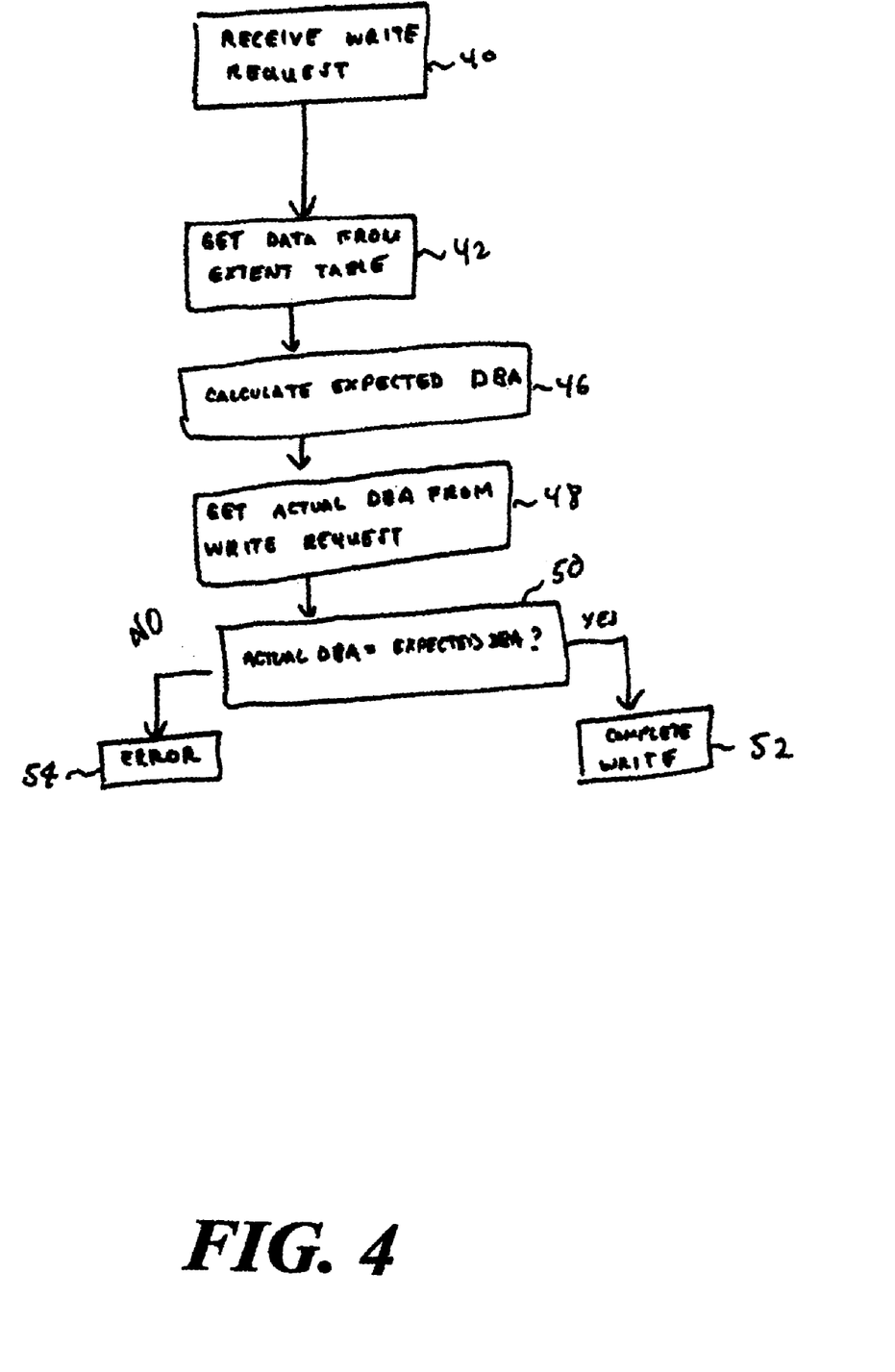
FIG. 4 shows a verification method in which intra-database addresses are compared.
Figure 5:
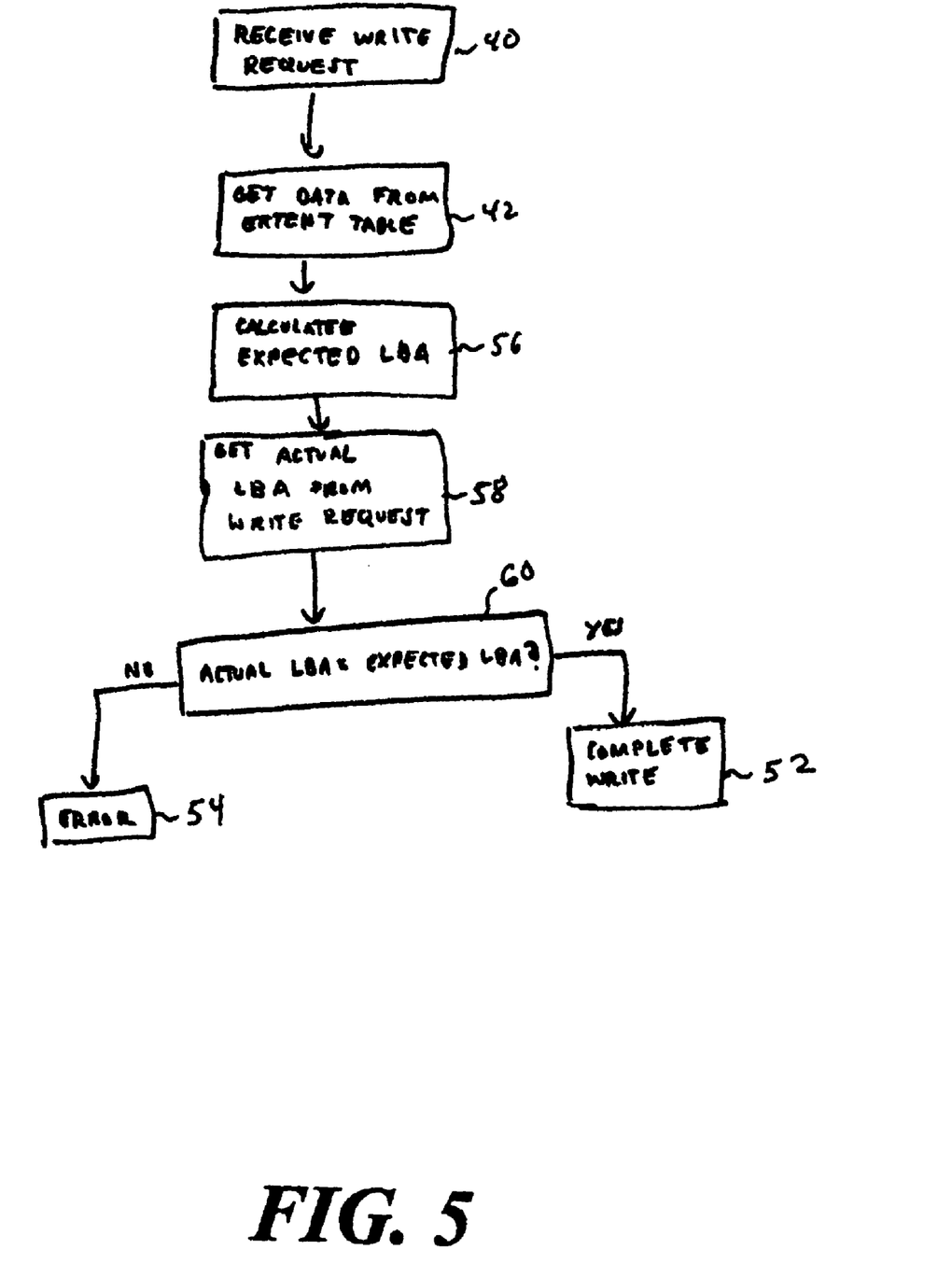
FIG. 5 shows an alternate verification method in which logical device-addresses are compared.

A relationship therefore exists between a database record's external address 36 and its internal address 30. This relationship can be used to determine whether an instruction to write a database record 24 to a particular target location (corresponding to the external address 36) should be consummated or rejected. Exemplary methods for determining whether to reject a proposed write instruction are shown in FIGS. 4 and 5, both of which begin with the receipt of a write instruction from a database application 12 being executed by a host 10 (step 40). The write instruction specifies the data record 24 to be written, as well as a target external address (hereafter referred to as the "target address") at which the data record 24 is to be written.

Referring first to FIG. 4, upon receiving a write instruction, the extent-table 20 relevant to the target address is examined (step 42). On the basis of information in the extent-table 20, an expected internal address corresponding to the target address is determined (step 46). The actual internal address 30 is then retrieved (step 48) and compared with the expected internal address (step 50). If the expected internal address and the actual internal address 30 match, the write is carried out (step 51). Otherwise, an error is generated (step 54).

In an alternative method, shown in FIG. 5, upon receiving the write instruction (step 40), the extent-table 20 relevant to the target address is examined (step 42). On the basis of information in the extent-table 20, an expected target address corresponding to the internal address 30 in the data record 24 is determined (step 56). The target address specified in the write instruction is then retrieved (step 58) and compared with the expected target address (step 60). If the expected target address and the target address match, the write instruction is carried out (step 52). Otherwise, an error is generated (step 54).

Figure 6:
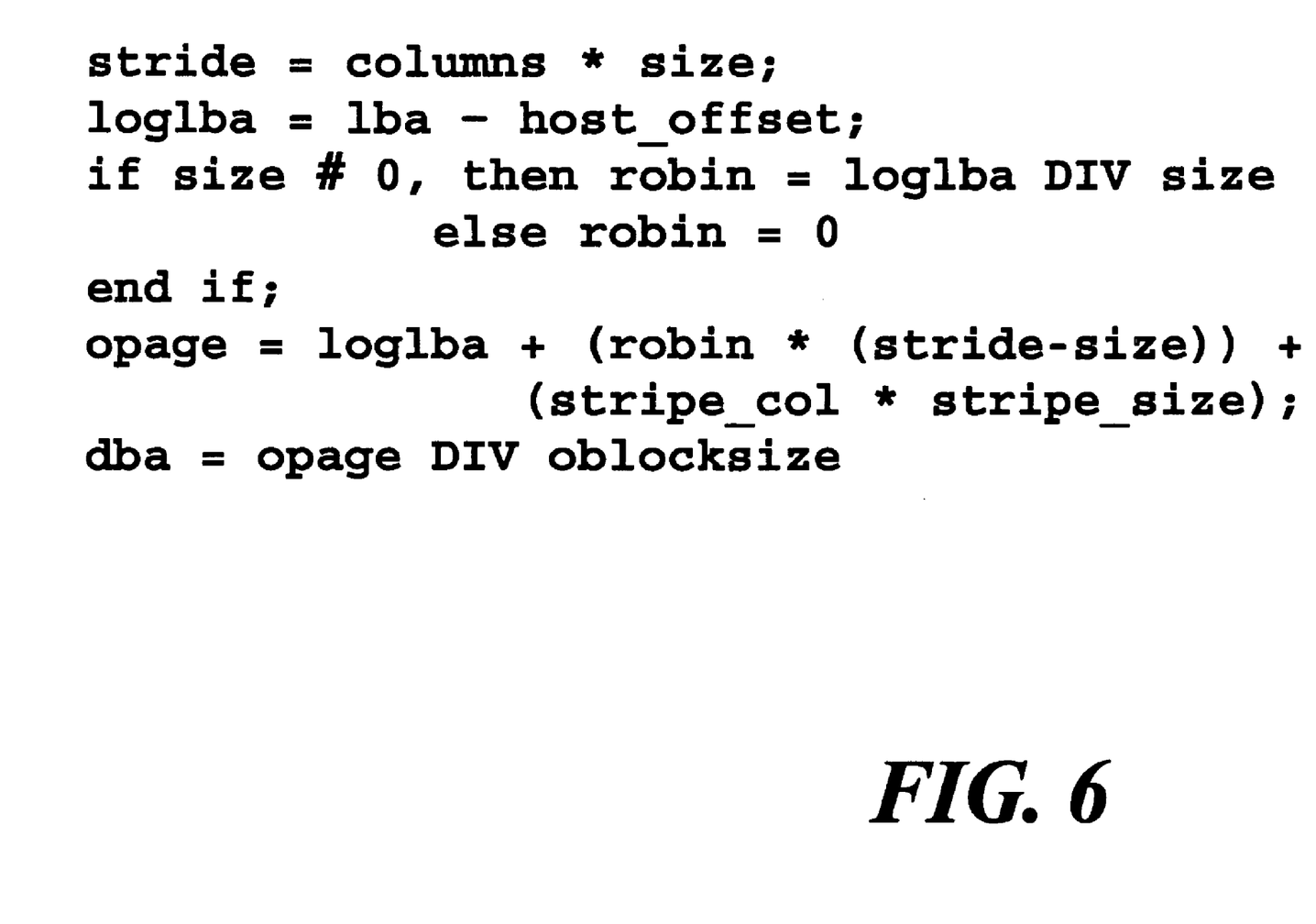
FIG. 6 shows pseudo-code for carrying out the method shown in FIG. 4.

FIG. 6 shows a procedure to be carried out in connection with the method in FIG. 4 for determining the expected internal address. In FIG. 6, all mathematical operations are integer operations. The "DIV" operator is an integer divide, in which any remainder is discarded. The variable "columns" refers to the number of devices across which the database 22 is striped. The variable "stripe" refers to the size of the stripe. The variable "stripe-col" correspond to the particular column on which the extent starts. If the database 22 is stored on one logical device 18, both "stripe" and "columns" are set to zero. The variable "host_offset" is the number of bytes allocated in a logical device 18 for a device label at the beginning of the logical device address space. Values for each of these variables are obtained from the extent tables 20.

The variable "lba" is the target address (i.e., the external address to which the data record 24 is to be written). The value of this variable is provided by the write instruction.

As an example, consider the case in which a database 22 is striped across three logical devices 18, with 1,024,000 bytes in each stripe. Assume that the database record size is 16,384 bytes and that there are different host offsets (e.g. 64 blocks, 32 blocks, and 544 blocks) for each of the three logical devices 18.

In this case, the internal addresses 30 of the database 22 would be distributed as follows across the three devices:

| DEVICE 0 | DEVICE 1 | DEVICE 2 |
|---|---|---|
| 0-61 | 62-123 | 124-185 |
| 186-247 | 248-309 | 310-371 |
| 372-433 | 434-495 | 496-557 |
| 558-619 | 620-681 | 682-743 |
| 744-805 | 806-867 | 868-929 |

The corresponding entries in the extent tables 20 would appear as follows:

| Extent table entry for: | DEVICE 0 | DEVICE 1 | DEVICE 2 |
|---|---|---|---|
| Total Offset | 64 blocks | 32 blocks | 544 blocks |
| Database record size | 32 blocks | 32 blocks | 32 blocks |
| Stripe size | 1984 blocks | 1984 blocks | 1984 blocks |
| Columns | 3 | 3 | 3 |

Under these circumstances, if the data storage system 14 were to receive an instruction to write a database record 24 to a target address of 4000, an expected internal address would be calculated as follows, using the procedure shown in FIG. 6:

| | |
|---|---|
| stride = | 3 * 1984 = 5952 |
| loglba = | 4000 − 32 = 3968 |
| robin = | 3968/1984 = 2 |
| opage = | 3968 + (2 * (3968)) + (1 * 1984) = 13888 |
| dba = | 13888/32 = 434 |

The expected internal address of the data record 24 is thus 434. If the actual internal address 30 is not 434, then a write to the target location 4000 is improper and should be rejected.

As another example, consider a data storage system 14 that receives an instruction to write a database record 24 to a target address of 10432. In that case, a corresponding expected internal address would be calculated as follows, using the procedure shown in FIG. 6:

| | |
|---|---|
| stride = | 3 * 1984 = 5952 |
| loglba = | 8480 − 544 = 7936 |
| robin = | 7936/1984 = 4 |
| opage = | 7936 + (4 * (3968)) + (2 * 1984) = 27776 |
| dba = | 30272/32 = 868 |

The expected internal address of the data record 24 should thus be 868. If the actual internal address 30, which is extracted from the header portion 26 of the data record 24, is not 868, then a write of that data record 24 to the target location 10432 is improper and should be rejected.

Figure 7:
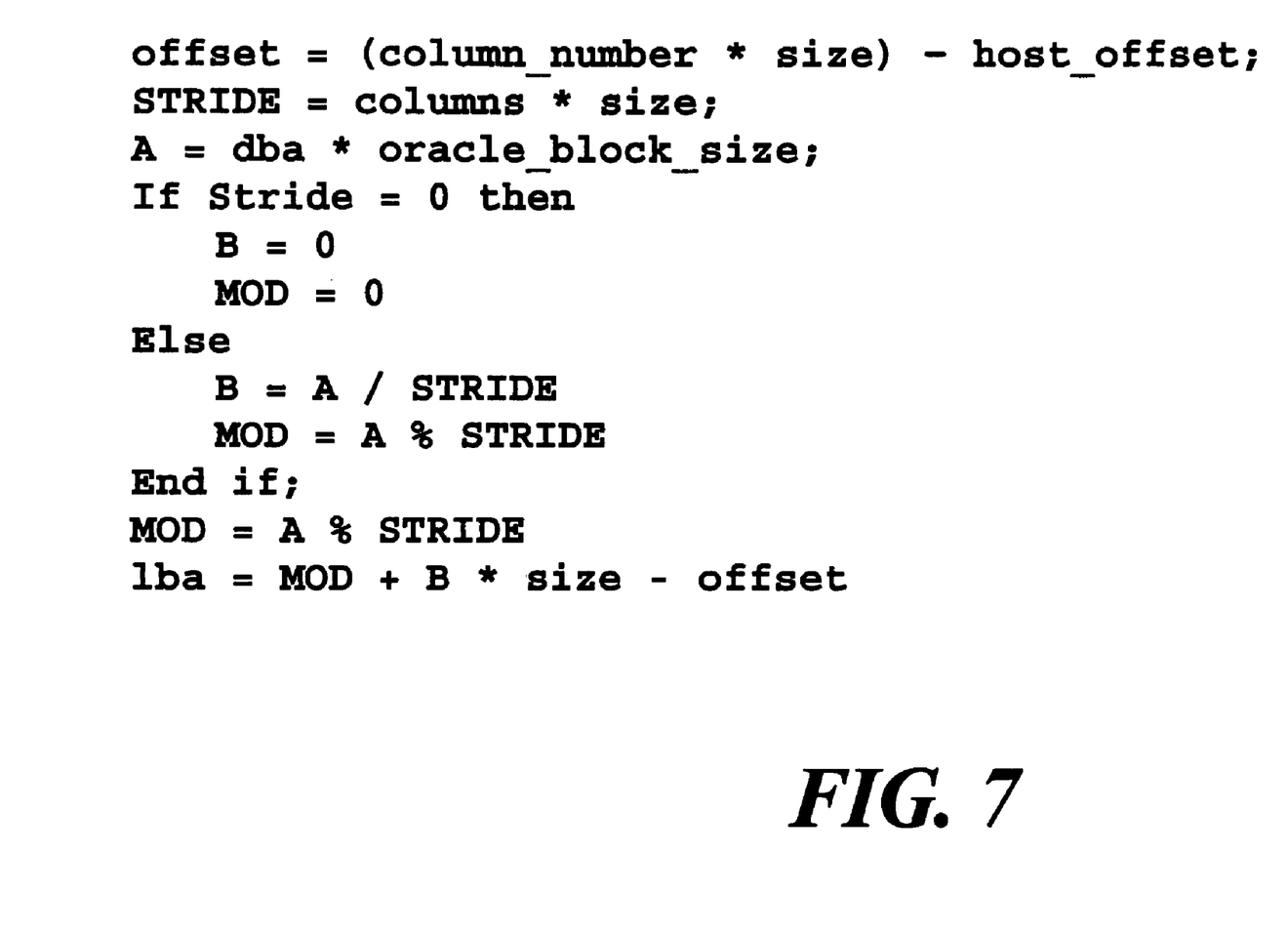
FIG. 7 shows pseudo-code for carrying out the method shown in FIG. 5.

FIG. 7 shows a procedure to be carried out in connection with the method in FIG. 5 for determining an expected target address. In FIG. 7, all mathematical operations are integer operations. The variables "size," "columns," and "host_offset" have the same meanings as they did in connection with FIG. 6. The variable "column_number" is the column in which the data record 24 is to be written. These values are all available in the extent-table 20.

The operator "%" is the remainder that is discarded in connection with execution of the "DIV" operation in FIG. 6.

Note that a trap must be included to prevent division by zero when the database 22 is not striped.

The variable "dba" is the internal address 30 of the data record 24 that is to be written to the database 22. This value is obtained from the header portion 26 of that data record 24. The procedure set forth in FIG. 7 uses this internal address 30 to determine an expected target address to which the data record 24 can be properly written. It then compares that expected target address with the actual target address that is specified in the write instruction.

As an example, consider a database 22 that is striped across three devices, with a stripe size of 4096 bytes. Assume that the database record size is 8 blocks and that the host offset is 16 blocks. In this case, database blocks would be distributed across the three devices as follows:

| DEVICE 1 | DEVICE 2 | DEVICE 3 |
|---|---|---|
| 0-9 | 10-19 | 20-29 |
| 30-39 | 40-49 | 50-59 |
| 60-69 | 70-79 | 80-89 |
| 90-99 | 100-109 | 110-119 |
| 120-129 | 130-139 | 140-149 |

The following information would then appear in the extent-table 20:

| Extent table entry for: | Device 1 | Device 2 | Device 3 |
|---|---|---|---|
| Offset | 16 blocks | 96 blocks | 176 blocks |
| Database record size | 8 blocks | 8 blocks | 8 blocks |
| Stripe size | 80 blocks | 80 blocks | 80 blocks |
| Columns | 3 | 3 | 3 |

Assume that the host 10 issues a write instruction to write a data record 24 having an internal address 30 of 90. In that case, the expected target address for the data record 24 would be determined as follows, using the procedure in FIG. 7:

Offset=(0*0)−16=16
STRIDE=3*80=240
A=90*8=720
B=720/240=3
MOD=720% 240=0
lba=0+3*80−(−16)=256

The expected address is thus 256. If the write instruction requests that the data record 24 be written to a target address of 256, then the write instruction is accepted. Otherwise, an error is generated.

Having described the invention, and a preferred embodiment thereof, what is claimed as new and secured by Letters Patent is:

1. A method for processing a write instruction for writing data to a database stored on a logical device, the method comprising:
obtaining a first address that specifies the location of the data in a first address space; obtaining a second address that specifies the location of the data in a second address space distinct from the first address space; on the basis of the second address, calculating a third address corresponding to an expected location of the data record in the first address space; on the basis of a comparison between the first address and the third address, causing one of an execution of the write instruction and generation of an error condition.

2. The method of claim 1, further comprising writing the data to the second address.

3. The method of claim 1, further comprising writing the data to the first address.

4. The method of claim 1, further comprising: confirming that the first address matches the third address; and causing execution of the write instruction.

5. The method of claim 1, further comprising: identifying a mismatch between the first address and the third address; and causing generation of an error condition.

6. The method of claim 1, further comprising: selecting the first address to identify a location of the data relative to other data in the database; and selecting the second address to identify a location of the data relative to other data on the logical device.

7. The method of claim 1, further comprising: selecting the first address to identify a location of the data relative to other data on the logical device; and selecting the second address to identify a location of the data relative to other data in the database.

8. The method of claim 1, wherein calculating a third address comprises reading extent data from an extent table associated with said logical device, and calculating the third address at least in part on the basis of the extent data.

9. The method of claim 8, wherein reading extent data comprises reading data indicative of: a fourth address identifying a location of a database record on the logical device; and an offset associated with each database record.

10. The method of claim 8, wherein reading extent data comprises reading data indicative of a host offset on the logical device.

11. The method of claim 8, wherein reading extent data comprises reading data associated with of striping of the database across a plurality of logical devices.

12. A method for processing a write instruction for writing data to a database, the method comprising: obtaining an actual internal address that specifies a location of the data record relative to other data records in the database; obtaining an external address to which the data record is to be written; retrieving extent data from which a correspondence between an internal address and an external address is derivable; on the basis of the extent data; determining a relationship between the actual internal address and a target location; and on the basis of the relationship, causing one of execution of the write instruction and generation of an error condition.

13. The method of claim 12, further comprising confirming that the target location is consistent with the actual internal address, and consummating the write instruction.

14. The method of claim 12, wherein determining a relationship comprises determining an expected internal address on the basis of the extent data and the target location.

15. The method of claim 14, further comprising confirming that the expected internal address is consistent with the actual internal address, and consummating the write instruction.

16. The method of claim 12, wherein determining a relationship comprises determining an expected external address on the basis of the extent data and the target location.

17. The method of claim 16, further comprising confirming that the expected external address is consistent with the target location, and consummating the write instruction.

18. The method of claim 12, wherein retrieving extent data comprises retrieving data indicative of a host offset for the logical device.

19. The method of claim 12, wherein retrieving extent data comprises retrieving data descriptive of striping of the database across at least two logical devices.

20. A non-transitory computer-readable medium having encoded thereon software for processing a write instruction for writing data to a database stored on a logical device, the software comprising instructions for: obtaining a first address that specifies the location of the data in a first address space; obtaining a second address that specifies the location of the data in a second address space distinct from the first address space; calculating a third address corresponding to an expected location of the data record in the first address space; causing one of execution of the write instruction and generation of an error condition on the basis of a comparison between the first address and the third address.

21. A non-transitory computer-readable medium having encoded thereon software for processing a write instruction for writing data to a database stored on a logical device, the software comprising instructions for: obtaining an actual internal address that specifies a location of the data record relative to other data records in the database; obtaining an external address to which the data record is to be written; retrieving extent data from which a correspondence between an internal address and an external address is derivable; and on the basis of the extent data; determining a relationship between the actual internal address and target location; and on the basis of the relationship, causing one of execution of the write instruction and generation of an error condition.

22. A data-storage system for processing a write instruction for writing data to a database stored on a logical device, the system comprising a non-transitory computer-readable medium as recited in claim 20.

23. A data-storage system for processing a write instruction for writing data to a database stored on a logical device, the system comprising a non-transitory computer-readable medium as recited in claim 21.

* * * * *